(12) United States Patent
Sarmah et al.

(10) Patent No.: US 10,138,165 B2
(45) Date of Patent: *Nov. 27, 2018

(54) HIGH STRENGTH, OPERATIONALLY ROBUST LOST CIRCULATION PREVENTATIVE PSEUDO-CROSSLINKED MATERIAL

(71) Applicant: BAKER HUGHES INCORPORATED, Houston, TX (US)

(72) Inventors: Pranjal Sarmah, Sivasagar Assam (IN); Prahlad Kumar Yadav, Jabalpur M.P. (IN); Gaurav Agrawal, Aurora, CO (US); Tianping Huang, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,386

(22) Filed: Mar. 29, 2017

(65) Prior Publication Data

US 2017/0197884 A1 Jul. 13, 2017

Related U.S. Application Data

(62) Division of application No. 14/729,567, filed on Jun. 3, 2015, now Pat. No. 9,708,869.

(51) Int. Cl.
*C04B 28/32* (2006.01)
*E21B 21/00* (2006.01)
(Continued)

(52) U.S. Cl.
CPC ............ *C04B 28/32* (2013.01); *C04B 28/105* (2013.01); *C09K 8/487* (2013.01); *E21B 21/003* (2013.01);
(Continued)

(58) Field of Classification Search
CPC ..... C04B 28/32; C04B 28/165; C04B 24/165; C04B 2103/20; C04B 2103/44;
(Continued)

(56) References Cited

U.S. PATENT DOCUMENTS 3,878,110 A 4/1975 Miller et al.
5,281,270 A 1/1994 Totten et al.
(Continued)

OTHER PUBLICATIONS

Mata, Freddy et al., "Crosslinked Cements Solve Lost Circulation Problems," SPE-90496, 5 pp. (Sep. 2004).
(Continued)

*Primary Examiner* — Anthony J Green
(74) *Attorney, Agent, or Firm* — Mossman, Kumar & Tyler, P.C.

(57) ABSTRACT

A formulation for use as a lost circulation preventive material is a cement-forming aqueous fluid comprising water, at least one viscoelastic surfactant (VES), at least one monovalent or multivalent salt, at least one magnesium powder, and at least one retarder. The formulation is used in a method of drilling into a subterranean formation that includes introducing into a wellbore passing at least partially through the subterranean formation the cement-forming aqueous fluid, and further increasing the viscosity of the aqueous fluid by the action of the VES forming elongated micelles; where the at least one monovalent salt is present in an amount effective to pseudo-crosslink the elongated VES micelles to further increase the viscosity of the aqueous fluid. The formulation further forms a cement by reacting the at least one magnesium powder and the water which reaction is retarded by the retarder. The water may be saline water.

20 Claims, 4 Drawing Sheets

(51) Int. Cl.
*E21B 33/138* (2006.01)
*C04B 28/10* (2006.01)
*C09K 8/487* (2006.01)
*C04B 103/20* (2006.01)
*C04B 103/44* (2006.01)
*C04B 103/50* (2006.01)

(52) U.S. Cl.
CPC ........ *E21B 33/138* (2013.01); *C04B 2103/20* (2013.01); *C04B 2103/44* (2013.01); *C04B 2103/50* (2013.01); *C09K 2208/30* (2013.01)

(58) Field of Classification Search
CPC .......... C04B 2103/50; C04B 2103/408; C04B 2201/20; C04B 2201/50; C09K 8/06; C09K 8/48; C09K 8/487; C09K 2208/30; E21B 33/138; E21B 21/003
See application file for complete search history.

(56) References Cited

U.S. PATENT DOCUMENTS

| | | | |
|---|---|---|---|
| 7,530,394 B2 | 5/2009 | Santra et al. | |
| 8,544,565 B2 | 10/2013 | Huang et al. | |
| 8,627,888 B2 | 1/2014 | Santra et al. | |
| 8,921,285 B2 | 12/2014 | Huang et al. | |
| 8,946,133 B2 | 2/2015 | Lee et al. | |
| 8,950,486 B2 | 2/2015 | Benkley et al. | |
| 9,023,150 B2 | 5/2015 | Brenneis et al. | |
| 9,115,304 B2 | 8/2015 | Thaemlitz | |
| 9,206,673 B2 | 12/2015 | Thaemlitz | |
| 9,353,306 B2 | 5/2016 | Svoboda et al. | |
| 9,708,869 B2 * | 7/2017 | Sarmah | E21B 21/003 |
| 9,828,293 B2 * | 11/2017 | Yadav | C04B 28/105 |
| 2010/0071957 A1 | 3/2010 | Huang et al. | |
| 2011/0083902 A1 | 4/2011 | Huang et al. | |
| 2011/0089386 A1 | 4/2011 | Berry et al. | |

OTHER PUBLICATIONS

Cole-Hamilton, Jim et al., "Chemical Intervention Technology for Low-Risk Annular Isolation in Existing Gravel Packed Wells and Uncemented Annuli," SPE-115254, 12 pp. (Sep. 2008).

Huang, Tianping et al., "Protecting the Reservoir With Surfactant Micellar Drill-In Fluids in Carbonate-Containing Formations," SPE-135166, pp. 492-498 (Jul. 2011).

Al-Azmi, Bader, et al., "A Cross-Link Polymer Sealant for Curing Severe Lost Circulation Events in Fractured Limestone Formations," SPE-171411-MS, 6 pp. (Oct. 2014).

Int'l Search Report and Written Opinion in PCT/US2016/035543 dated Sep. 12, 2016.

\* cited by examiner

FIG. 1

FIG. 2A　　　Stage 1　　　FIG. 2B

FIG. 3A　　　Stage 2　　　FIG. 3B

HIGH STRENGTH, OPERATIONALLY ROBUST LOST CIRCULATION PREVENTATIVE PSEUDO-CROSSLINKED MATERIAL

CROSS-REFERENCE TO RELATED APPLICATION

This application is a divisional application from U.S. patent application Ser. No. 14/729,567 filed Jun. 3, 2015, issued as U.S. Pat. No. 9,708,869 on Jul. 18, 2017, incorporated herein by reference in its entirety.

TECHNICAL FIELD

The present invention relates to methods of drilling through non reservoir and reservoir sections of subterranean formations during hydrocarbon recovery operations, and more particularly relates, in one non-limiting embodiment, to using cement-forming aqueous fluids that contain components that inhibit or prevent fluid loss into the subterranean formation.

TECHNICAL BACKGROUND

Drilling fluids are categorized into water-based mud and oil-based mud. Drilling fluids are used to drill horizontal and vertical long section of non reservoir section. Water based drilling fluids designed with water, polymer needed to increase viscosity for carrying the cuttings and for fluid loss control, monovalent and multivalent salts for shale inhibition, different bridging material and weighting materials (barium sulfate, manganese tetroxide, hematite for desired mud weight, whereas Drill-in fluids are special fluids designed exclusively for drilling through the reservoir section of a subterranean formation. The reasons for using specially designed drilling fluids include, but are not necessarily limited to (1) to drill the reservoir zone successfully, which is often a long, horizontal drain hole, (2) to minimize damage of the near-wellbore region and maximize the eventual production of exposed zones, and (3) to facilitate the necessary well completion. Well completion may include complicated procedures. Typically, drill-in fluids may resemble completion fluids. Drill-in fluids may be brines containing only selected solids of appropriate particle size ranges (for instance, salt crystals or calcium carbonate) and polymers. Usually, additives needed for filtration control and cuttings carrying are present in a drill-in fluid. As noted, drill-in fluids may contain filtration control additives to inhibit or prevent loss of the drill-in fluid into the permeable formation. Fluid loss involves the undesired leakage of the liquid phase of drill-in fluid containing solid particles and complete losses without any return into the formation matrix. The resulting buildup of solid material or filter cake against the borehole wall may be undesirable, as may be the penetration of the filter cake into the formation. The removal of filter cake, which sometimes must be done by force, may often result in irreparable physical damage to the near-wellbore region of the reservoir. Fluid-loss additives are used to control the process and avoid potential damage of the reservoir, particularly in the near-wellbore region. Specially designed fluids may be used to be placed next to the reservoir and make a seal. This fluid may be different than the drill-in fluid and is often referred to as a "sealing or lost circulation pill".

Subterranean formations having naturally occurring fractures present a problem because the fractures exacerbate undesired leakage of the liquid portion of the drill-in fluid into the formation. Thus, lost circulation fluid may be a major challenge when drilling through such naturally fractured carbonate, sandstone formations, etc.

Some lost circulation fluids are gelled, such as by gelling polymers and optionally crosslinking the resulting polymers. However, it is important to avoid premature gelation, and also important for the finally gelled material to have sufficient viscosity and strength to achieve the goal of inhibiting or preventing fluid loss. Current commercial offerings have insufficient operational robustness; examples including, but not necessarily limited to, commercial lost circulation material (LCM) technology based on polymer resin sealing or thixotropic slurry or high fluid loss pill.

It would thus be desirable to discover a drill-in fluid or a sealing pill, a drilling fluid or other fluid which would have relatively low viscosity in the drilling pipe but which would shortly after leaving the drill bit increase in viscosity and inhibit or prevent fluid leak-off into the formation.

SUMMARY

There is provided in one non-restrictive version, a method of drilling into a subterranean formation involving introducing into a wellbore passing at least partially through the subterranean formation a cement-forming aqueous fluid. The cement-forming aqueous fluid includes water, at least one viscoelastic surfactant (VES), at least one monovalent or multivalent salt, at least one magnesium powder comprising 30-80 wt % MgO and greater than 20 wt % dolomite, and at least one retarder. The method further involves increasing the viscosity of the cement-forming aqueous fluid by the action of the at least one VES forming elongated micelles, where the at least one monovalent salt is present in an amount effective to pseudo-crosslink the elongated VES micelles to further increase the viscosity of the aqueous fluid. Additionally, the method involves forming a cement by reacting at least one magnesium powder and the water, where the forming of cement is retarded from that which would otherwise occur but for the presence of the retarder. The method further involves inhibiting fluid loss of the fluid into the formation by the combined action of the pseudo-crosslinked VES micelles and the MgO-based cement.

There is also provided, in another non-limiting form, a cement-forming aqueous fluid for use in inhibiting the fluid loss of the cement-forming aqueous fluid into a subterranean formation, where the aqueous fluid includes water, at least one viscoelastic surfactant (VES), at least one monovalent or multivalent salt, at least one magnesium powder comprising 30-80 wt % MgO and greater than 20 wt % dolomite, and at least one retarder. Optionally, a defoamer is included.

DETAILED DESCRIPTION

A new formulation for use as a loss circulation solution has been discovered. A differentiation of the new formulation and its method of use involves the incorporation of viscoelastic surfactants (VESs) or similar chemistry that enables the formulation to be pumpable and have its gelation deferred until it is in right place in the subterranean formation. The aqueous fluid formulation contains at least one viscoelastic surfactant or similar chemistry with one or more soluble monovalent salts and/or brine and/or one or more multivalent salt or brine.

For lost circulation prevention or inhibition, it is important to avoid premature gelation but also for the gelled material to have sufficient viscosity and strength. As noted, current commercial offerings have insufficient operational robustness. The method and composition described herein could provide a better operating window, specifically the formulation has at least two additional advantages—(a) it could be formulated with saline water such as sea water and (b) it could be cleaned up post-job to recover a pre-job reservoir state. Saline water is defined herein to include, but not necessarily be limited to, sea water, produced water, synthetic sea water, formation water, salt water, brine, and the like and mixtures thereof. It has been discovered that the use of VES, with or without saline water, builds enough pumpable viscosity that carries a powder mixture of active ingredients, in non-limiting examples a magnesium based powder and borate powder. The choice of magnesium based powder is also important to the functioning of this formulation. The formulation does not setup prematurely in ambient conditions. The active mixture may be pumped to the zones in the reservoir and non-reservoir that are subject to fluid loss. Upon being heated to the wellbore temperature, it sets up as a cementitious plug with adequate strength to prevent the fluid losses. At the end of the operation, if required, the set solid material could be dissolved with acid flush. The slurry can be designed to have density in range of 10 ppg to 14 ppg (1.2 to 1.7 kg/L). The setting time of the plug is controlled by a boron-based retarder to about 1 to about 3 hours and more up to temperature from 70° F. (21° C.) and up to 230° F. (110° C.); alternatively forming the cement is triggered by a temperature between about 90° F. (32° C.) to about 100° F. (38° C.). Different, non-limiting threshold or trigger temperatures are about 90° F. (32° C.) to about 100° F. (38° C.). For all of these temperatures, it should be realized that these are initial temperatures and that it is expected that in most cases the temperature will rise further.

The method and formulation involve two phenomena: a) Pseudo-crosslinking of the elongated or "worm-like" VES micelles formed of the VES molecules, which helps the gelled fluid to fill the voids with its viscous flow and b) set like a cement plug (in the loss zone) over the period of time and elevated temperature. This is again a pseudo-crosslinking where VES forms elongated worm-like micelle structure in presence of monovalent and/or multivalent salts like magnesium chloride, calcium chloride, calcium bromide, potassium chloride, aluminum chloride, and mixtures of them, etc. This is not polymer and crosslinker based crosslinking. In one non-limiting theory or explanation, when the fluid containing the VES and the at least one monovalent or multivalent salt is heated at least one monovalent or multivalent salt associate, link, connect, or relate the VES micelles to one another thereby further increasing the viscosity of the fluid. This is somewhat analogous to the way crosslinkers connect various polymer chains and is sometimes called "pseudo-crosslinking", but the way the at least one monovalent or multivalent salt associate the elongated or "worm-like" VES micelles is believed to be completely different than the crosslinking that occurs in polymers.

In the formulations and methods described herein, magnesium powder (MgO) also works as cement which sets hard; and boron-based compound works as a retarder to control that hardening/setting process with respect to temperature and time. Hardening and retarding chemistry is further explained below.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or dipropionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms.

One specific suitable VES is ARMOVIS EHS® VES surfactant supplied by Akzo Nobel. The structure of which is shown in formula (II). This VES will help to build the viscosity for higher temperature up to 350° F. (177° C.) in presence of monovalent and/or multivalent salt brine.

(II)

(III)

Compound name ARMOVIS EHS: Erucamidopropyl Hydroxypropylsultaine

Figure 1:
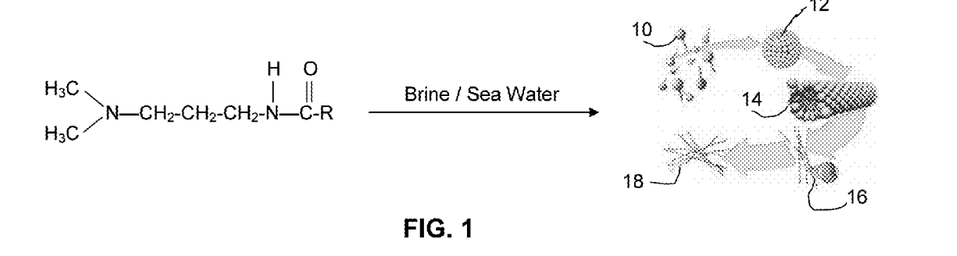
FIG. 1 is a schematic illustration of how one viscoelastic surfactant (VES) in the presence of brine or sea water transitions from individual surfactant molecules into spherical micelles, then to elongated or "worm-like" micelles, which in turn can form entanglements, and finally be pseudo-crosslinked.

Typical properties of ARMOVIS EHS® VES surfactant include the following:
- Appearance—liquid, with 50% solids
- Pour point—41° F. (12° C.)
- pH—8
- Specific gravity—1.0
- Solvent package—EtOH/PG/Water Shown in FIG. 1 is a schematic illustration of how one VES, in this case an amine oxide, in the presence of brine or sea water transitions from individual surfactant molecules 10 into spherical micelles 12, then to elongated or "worm-like" micelles 14, which in turn can form entanglements 16 that increase the viscosity of the aqueous fluid, and finally be pseudo-crosslinked 18 with one or more monovalent salts and/or multivalent salts. The monovalent salts and/or multivalent salts serve as pseudo-crosslinking agents, which further increase entanglement of the elongated micelles and hence increase viscosity further.

Another suitable specific VES is an amine oxide of formula (I) namely AROMOX® APA TW supplied by Akzo Nobel that may be used for the lower temperature range to build the pseudo-crosslinking up to 250° F. (121° C.).

The amount of the VES with respect to the water in the aqueous fluid may range from about 0.01 wt % independently to about 10 wt %; about 0.01 gps independently to about 2 gps. As used herein with respect to a range, "independently" means that any lower threshold may be combined with any upper threshold to give a suitable alternative range. Stated another way, the at least one VES is present in the aqueous fluid in an amount from about 0.01 gps independently to about 2 gps; alternatively from about 0.05 gps independently to about 1 gps. It will be appreciated that the abbreviation "gps" also refers to the cement-forming aqueous fluid described herein as a basis.

Suitable monovalent salts, divalent salts, or multivalent salts include, but are not necessarily limited to, sodium chloride, potassium chloride, ammonium chloride, sodium bromide, sodium formate, potassium formate, calcium chloride, calcium bromide, magnesium chloride, zinc chloride, zinc bromide, aluminum chloride, saline water, and combinations thereof. To be clear, in some non-limiting embodiments, simply using saline water will provide enough monovalent salts or multivalent salts to pseudo-crosslink the elongated VES micelles.

With respect to suitable amounts of the at least one monovalent or multivalent salt, the amount of the at least one monovalent or multivalent salt is present in the aqueous fluid in an amount from about 0.01 independently to about 10% bwoc. Magnesium chloride salt up to 10% bwoc has been successfully used depending upon application, but salts can also be used up to saturation weight. An alternative range may be from about 1 independently to about 10% bwoc.

The sealant powder or magnesium powder reacts in the presence of water to form magnesium oxysulfate cement according to formula (III) below:

Magnesium powder is primarily a blend of MgO and dolomite. Dolomite is an anhydrous carbonate material composed of calcium magnesium carbonate having the chemical formula $CaMg(CO_3)_2$. In one non-limiting embodiment the magnesium powder has 30-80 wt % MgO and greater than 20 wt % dolomite. In one non-limiting embodiment the amount of the at least one magnesium powder present in the cement-forming aqueous fluid or the cement is an amount up to about 100 wt %.

Magnesium oxysulfate cement formation is controlled by sodium borate retarder. Sodium borate reacts with MgO and $MgSO_4$ to form magnesium borate and thus inhibit the formation of magnesium oxysulfate. The sealant (magnesium) powder can be used to design 10 ppg to 14 ppg fluid (1.2 to 1.7 kg/L); this is used as 100% by weight of cement. Basically fluid density of water 8.342 ppg (1 kg/L) and sealant powder are used to weight up to the desired density. MgO powder is limited to use up to 230° F. (110° C.). FIG. 3B is a photograph of a resulting hard cement plug of magnesium oxysulfate.

Suitable retarders include, but are not necessarily limited to, sodium borate, boric acid, disodium tetraborate decahydrate, and combinations thereof. The retarder is also sometimes called boron powder. As noted, the retarder is used to delay the thickening time of this magnesium powder based cement. It has been discovered that conventional retarders such as lignosulphonate, phosphate based synthetic retarder for Portland cement will not work here due to the different hydration and setting chemistry. Suitable proportions for the boron-based powder or retarder to be used in the fluid range from about 0.01% independently to about 20% bwoc and above can be used; alternatively, the proportion may range from about 1% independently to about 15% bwoc.

The aqueous fluid may also optionally include a defoamer as necessary to control excessive foaming that may interfere with the fluid loss material placement. Suitable defoamers include, but are not necessarily limited to, silicon-based defoamers, such as silicon emulsions and the like. It was discovered that alcohol-based defoamers do not work with this system. Typical concentration ranges for the defoamer is from about 0.001 gps independently to about 0.1 gps; alternatively from about 0.005 gps independently to about 0.05 gps.

The abbreviation "gps" is for Gallon per Sack of Cement (in the case of the cement-forming aqueous fluid compositions described herein, the magnesium powder). One sack of this cement contain 55 pound (lb.). All the calculations and concentrations of the additives/ingredients are based on the amount of cement while cement is taken as 100% in the formulation to design cement slurry. The approximate density range of the cement slurry of the aqueous fluid system ranges from about 10 ppg to about 14 ppg (pounds per gallon) (1.2 to 1.7 kg/L).

The initial gel of the aqueous fluid begins to build up at about 80° F. (27° C.); alternatively at about 100° F. (38° C.) and the system can work up to as high as about 300° F. (149° C.).

As noted, an advantage of the gel cement system described herein is that after the need for the hard cement plug is over, it may be dissolved with an acid flush in a conventional manner. Suitable acids for the flush include, but are not necessarily limited to, hydrochloric acid, formic acid, acetic acid, nitric acid, methane sulfonic acid, glutaric acid, glutamic acid, succinic acid, adipic acid, oxalic acid, glycolic acid, lactic acid, aminopolycarboxylic acids, and mixtures thereof.

In one embodiment, the methods and compositions herein are practiced in the absence of gel-forming polymers and/or gels or aqueous fluids having their viscosities enhanced by polymers. A known difficulty with polymers is that if they form a filter cake that penetrates the formation, the cake is difficult to remove without permanently damaging the near wellbore region of the formation. However, combination use with polymers and polymer breakers may also be of utility. For instance, polymers may also be added to the VES fluid for further improvement of fluid loss control. Types of polymers that may serve as fluid loss control agents include, but are not necessarily limited to, various starches, modified starches, polyvinyl acetates, polylactic acids, guar and other polysaccharides, hydroxyethylcellulose and other derivatized celluloses, gelatins, and the like.

The aqueous fluids and methods of this invention may be used in conjunction with other technologies including, but not necessarily limited to, U.S. Pat. Nos. 8,544,565 and 8,921,285, incorporated herein by reference in their entirety.

The present invention will be explained in further detail in the following non-limiting Examples that are only designed to additionally illustrate the invention but not narrow the scope thereof.

Laboratory Mixing Procedure

The loss control material (LCM) was mixed in a bottom drive blade type mixer used in the preparation of fluid slurries, as follows:
  Fill the required amount of fresh water or saline water and set the speed to 1000 rpm.
  Add the monovalent and/or multivalent salt and retarder and mix for 2-5 minutes.
  Add the VES surfactant and mix for 10-15 minutes.
  Add defoamer if required.
  Add the sealant powder at 2000-4000 rpm. Let the mixture become uniform.

Figure 2A:
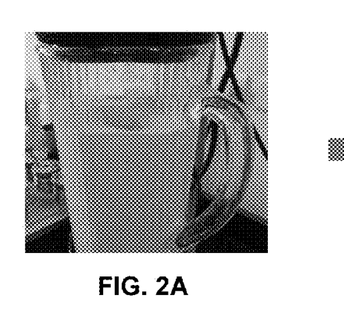
FIG. 2A is a photograph of a VES aqueous fluid containing MgO-based sealant powder in a blender container.
Figure 2B:
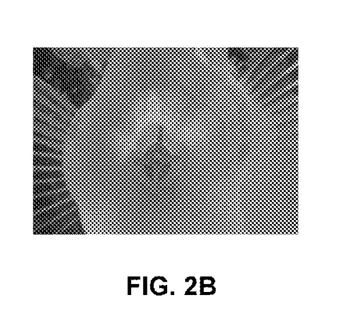
FIG. 2B is a top view photograph of the VES aqueous fluid containing sealant powder in the blender container of FIG. 2A showing no settling after mixing.

Shown in FIGS. 2A and 2B is Stage 1. FIG. 2A is a photograph of the VES aqueous fluid containing MgO-based sealant powder in a blender container. FIG. 2B is a top view photograph of the VES aqueous fluid containing sealant powder in the blender container of FIG. 2A showing no settling after mixing.

Figure 3A:
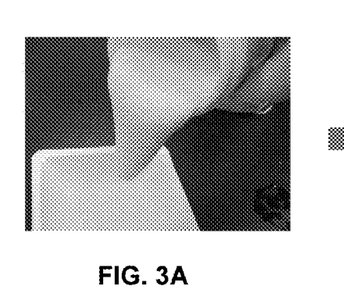
FIG. 3A is a photograph of the VES aqueous fluid of FIG. 2B that has been crosslinked being poured from the blender container into a mold.
Figure 3B:
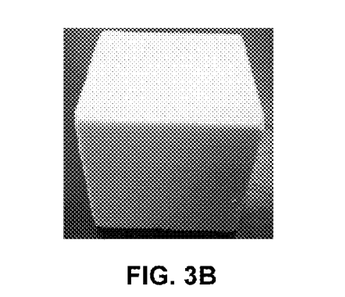
FIG. 3B is a photograph of final solid plug after being cured for two hours and removed from the mold of FIG. 3A.

Shown in FIGS. 3A and 3B is Stage 2. FIG. 3A is a photograph of the VES aqueous fluid of FIG. 2B that has been crosslinked being poured from the blender container into a mold. FIG. 3B is a photograph of final solid plug after being cured for two hours and removed from the mold of FIG. 3A.

Test Results

The results of the LCM systems with VES fluid along with powder sealant tested are summarized in the following Table II and FIGS. 4-7, including:
  Thickening Time.
  Compressive Strength.
  Viscosity.
For this 12.5 ppg (1.5 kg/L) fluid, the thickening time was more than 2 hrs. (2 hrs 39 minutes).

TABLE II

Formulation Design 12.5 PPG (1.5 kg/L) Slurry

| Additive | gps & bwoc | Weight (600 ml slurry) |
|---|---|---|
| Fresh Water | 6.47 gps | 406 gm |
| Defoamer | 0.01 gps | 0.61 gm |
| Retarder | 15% bwoc | 62 gm |
| Salt | 1% bwoc | 4.13 gm |
| VES | 0.2 gps | 12.5 gm |
| Sealant Powder | 100% bwoc | 413 gm |

Tables III and IV, respectively, present Thickening Time (TT) and Compressive Strength (CS) Results for 12.5 ppg (1.5 kg/L) and 14 ppg (1.7 kg/L) fluids at different temperatures.

TABLE III

Thickening Time and Compressive Strength
For 12.5 (1.5 kg/L) ppg Cement Slurry

| | Temp., ° F. (° C.) | | | | |
|---|---|---|---|---|---|
| | 125 (52) | 150 (66) | 175 (79) | 200 (93) | 225 (107) |
| TT (hr:min) | 2:40 | 1:40 | 1:50 | 2:35 | 1:16 |
| UCA (psi) | 525 | 815 | 423 | 300 | 380 |

TABLE IV

Thickening time and Compressive Strength
for 14 ppg (1.7 kg/L) Cement Slurry

| | Temp., ° F. (° C.) | | |
|---|---|---|---|
| | 150 (66) | 200 (93) | 225 (107) |
| TT (hr:min) | 3:30 | 1:30 | 1:26 |
| UCA (psi) | 1190 | 540 | 515 |

Figure 4:
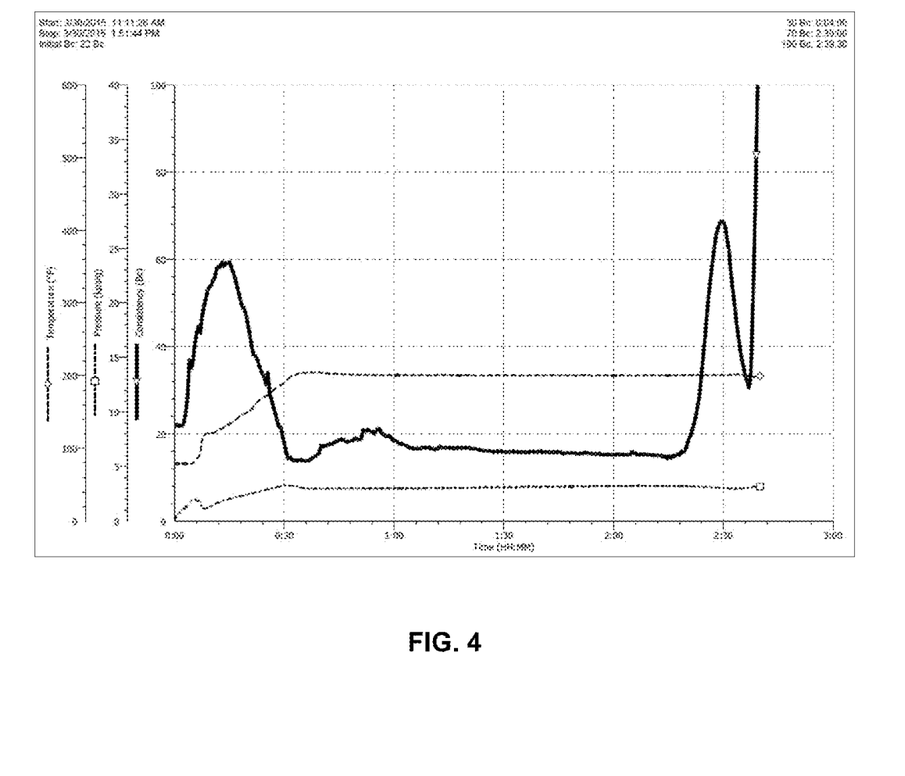
FIG. 4 is a thickening time chart for a 12.5 ppg (1.5 kg/L) slurry.
Figure 5:
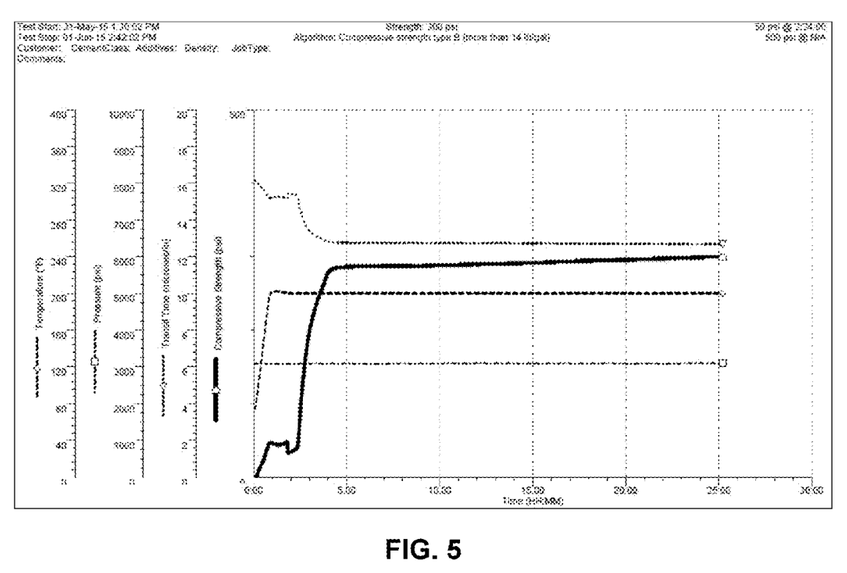
FIG. 5 is a chart of compressive strength by ultrasonic cement analyzer UCA for the 12.5 ppg (1.5 kg/L) slurry.
Figure 6:
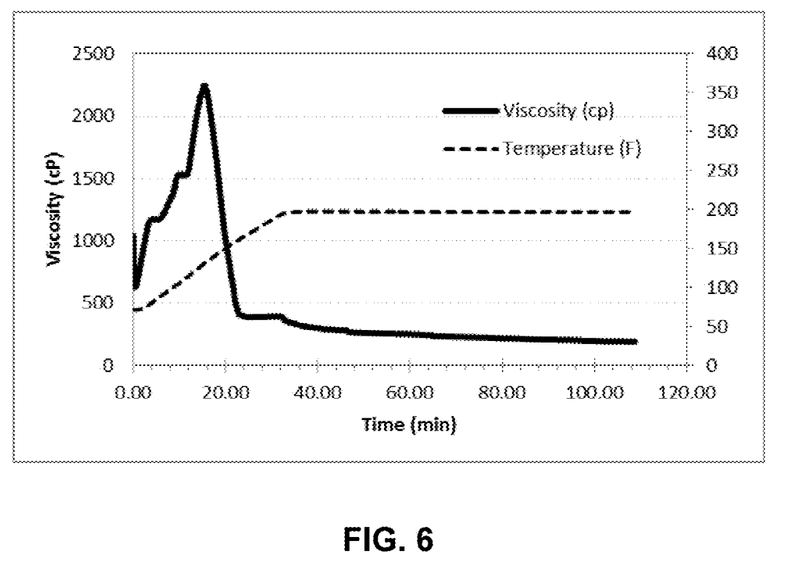
FIG. 6 is a chart of the fluid viscosity of the 12.5 ppg (1.5 kg/L) slurry.
Figure 7:
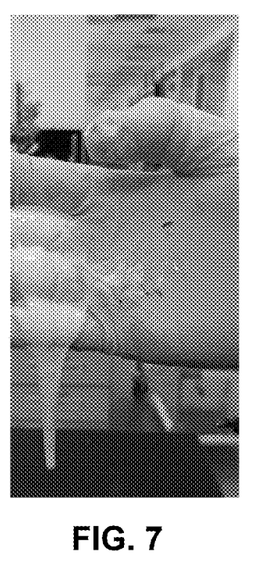
FIG. 7 is a photograph of the fluid after testing showing that the crosslinking of the VES gel persists.

FIG. 4 is a thickening time chart for the 12.5 ppg (1.5 kg/L) slurry. FIG. 5 is a chart of compressive strength by an ultrasonic cement analyzer (UCA) for the 12.5 ppg (1.5 kg/L) slurry. FIG. 6 is a chart of the fluid viscosity of the 12.5 ppg (1.5 kg/L) slurry. FIG. 7 is a photograph of the fluid after testing showing that the crosslinking of the VES gel persists.

A method and aqueous cement-producing fluid are provided as a loss circulation solution. An important differentiation over the use of only viscoelastic surfactants (VES) or similar chemistry that the aqueous fluid herein enables the formulation to be pumpable and to defer gelation until the fluid it is in right place in the formation. As noted, the fluid contains viscoelastic surfactant or similar chemistry with one or more soluble monovalent salt or brine and/or one or more multivalent salt or brine. For loss circulation prevention or inhibition, it is important to avoid premature gelation and for the gelled material to have sufficient viscosity and strength. Current commercial offerings have insufficient operational robustness; examples being commercial LCM technology based on polymer resin sealing, thixotropic slurries or high fluid loss pills.

The present methods and aqueous fluids provide a better operating window. Further advantages include: (a) it can be formulated with saline water and (b) it could be cleaned up post-job to recover a pre-job reservoir state—that is, with little or no damage to the reservoir. Use of VES, with or without saline water, builds enough pumpable viscosity that carries powder mix of active ingredients, namely the magnesium-based powder used for desired density and borate powder used as a retarder for control the solid cement set. Different weighting agents, such as barite, micronized barite, hausmannite, hematite, ilmenite, combinations of these and other dense fine particles can be used with MgO based powder to increase density. The choice of magnesium-based powder is also important to the functioning of this formulation. The formulation does not falsely setup in ambient conditions. The active mix is pumped to the potential fluid loss zones in the reservoir and non-reservoir portions of the subterranean formation. Upon being subjected to the wellbore temperature, it sets up as a cementitious plug with adequate strength to prevent and/or inhibit the fluid losses. At the end of the procedure, if required, the set solid material can be dissolved with acid flush.

In the foregoing specification, the invention has been described with reference to specific embodiments thereof, and has been demonstrated as effective in providing methods and compositions for using VES-gelled aqueous fluids comprising powders to inhibit or prevent fluid loss. However, it will be evident that various modifications and changes can be made thereto without departing from the broader scope of the invention as set forth in the appended claims. Accordingly, the specification is to be regarded in an illustrative rather than a restrictive sense. For example, specific combinations of viscoelastic surfactants, brines, monovalent salts, divalent salts, multivalent salts, magnesium powders, retarders, and optional defoamers and other components falling within the claimed parameters, but not specifically identified or tried in a particular method or aqueous fluid, are anticipated to be within the scope of this invention. Similarly, it is expected that the fluid loss prevention and inhibition methods may be successfully practiced using somewhat different mixing methods, temperature ranges, and proportions than those described or exemplified herein.

The words "comprising" and "comprises" as used throughout the claims is interpreted "including but not limited to".

The present invention may suitably comprise, consist of or consist essentially of the elements disclosed and may be practiced in the absence of an element not disclosed. For instance, there may be provided a method of drilling into a subterranean formation comprising, consisting essentially of, or consists of, introducing into a wellbore passing at least partially through the subterranean formation a cement-forming aqueous fluid, where the cement-forming aqueous fluid consists essentially of or consists of water, at least one VES, at least one monovalent or multivalent salt, at least one magnesium powder 30-80 wt % MgO and greater than 20 wt % dolomite; at least one retarder and optionally a defoamer. The method further consists essentially of or consists of increasing the viscosity of the cement-forming aqueous fluid by the action of the at least one VES forming elongated micelles; where the at least one monovalent salt is present in an amount effective to pseudo-crosslink the elongated VES micelles to further increase the viscosity of the aqueous fluid, forming a cement by reacting at least one magnesium powder and the water, where the forming of cement is retarded from that which would otherwise occur but for the presence of the retarder, and inhibiting fluid loss of the fluid into the formation by the combined action of the pseudo-crosslinked VES micelles and the cement.

There is further provided a cement-forming aqueous fluid for use in inhibiting the fluid loss of the aqueous fluid into a subterranean formation, used for cement zonal isolation, the aqueous fluid consisting essentially of or consisting of water, at least one VES, at least one monovalent or multivalent salt, at least one magnesium powder comprising 30-80 wt % MgO and greater than 20 wt % dolomite; at least one retarder, and optionally a defoamer.

What is claimed is:

1. A method of drilling into a subterranean formation comprising:
   introducing into a wellbore passing at least partially through the subterranean formation a cement-forming aqueous fluid comprising:
   water;
   at least one viscoelastic surfactant (VES);
   at least one monovalent or multivalent salt;
   at least one magnesium powder comprising 30-80 wt % MgO and greater than 20 wt % dolomite, which magnesium powder works as cement; and
   at least one retarder;
   increasing the viscosity of the cement-forming aqueous fluid by the at least one VES forming elongated VES micelles; where the at least one monovalent salt or multivalent salt is present in an amount effective to pseudo-crosslink the elongated VES micelles to further increase the viscosity of the aqueous fluid;
   forming a cement by reacting at least one magnesium powder and the water, where forming the cement is retarded from that which would otherwise occur but for the presence of the retarder; and
   thereby inhibiting fluid loss of the fluid into the formation.

2. The method of claim 1 where the forming the cement is triggered by a temperature of above 70° F. (21° C.).

3. The method of claim 1 where the at least one VES is present in the cement-forming aqueous fluid in a range of from about 0.01 wt % to about 10 wt % based on the water.

4. The method of claim 1 where the at least one VES is present in the cement-forming aqueous fluid in an amount from about 0.01 gps to 2 gps.

5. The method of claim 1 where the at least one monovalent or multivalent salt is selected from the group consisting of sodium chloride, potassium chloride, ammonium chloride, sodium bromide, sodium formate, potassium formate, calcium chloride, calcium bromide, magnesium chloride, zinc chloride, zinc bromide, aluminum chloride, and combinations thereof.

6. The method of claim 5 where the amount of the at least one monovalent or multivalent salt is present in the water in an amount from about 0.05 gps to above saturation.

7. The method of claim 1 where the at least one retarder is selected from the group consisting of sodium borate, boric acid, disodium tetraborate decahydrate, and combinations thereof.

8. The method of claim 7 where the at least one retarder is present in the aqueous fluid in an amount from about 0.01 to about 20% bwoc.

9. The method of claim 1 where the cement-forming aqueous fluid additionally comprises a defoamer.

10. The method of claim 9 where the defoamer is a silicon-based defoamer and where the amount of defoamer ranges from 0.001 to 0.1 gallons per sack of cement.

11. A method of drilling into a subterranean formation comprising:
    introducing into a wellbore passing at least partially through the subterranean formation a cement-forming aqueous fluid comprising:
    water;
    at least one viscoelastic surfactant (VES);
    at least one monovalent or multivalent salt selected from the group consisting of sodium chloride, potassium chloride, ammonium chloride, sodium bromide, sodium formate, potassium formate, calcium chloride, calcium bromide, magnesium chloride, zinc chloride, zinc bromide, aluminum chloride, and combinations thereof;

at least one magnesium powder comprising 30-80 wt % MgO and greater than 20 wt % dolomite, which magnesium powder works as cement; and at least one retarder;

increasing the viscosity of the cement-forming aqueous fluid by the at least one VES forming elongated VES micelles; where the at least one monovalent salt or multivalent salt is present in an amount effective to pseudo-crosslink the elongated VES micelles to further increase the viscosity of the aqueous fluid;

forming a cement by reacting at least one magnesium powder and the water triggered by a temperature of above 70° F. (21° C.), where forming the cement is retarded from that which would otherwise occur but for the presence of the retarder; and thereby inhibiting fluid loss of the fluid into the formation.

12. The method of claim 11 where the at least one VES is present in the cement-forming aqueous fluid in a range of from about 0.01 wt % to about 10 wt % based on the water.

13. The method of claim 11 where the at least one VES is present in the cement-forming aqueous fluid in an amount from about 0.01 gps to 2 gps.

14. The method of claim 11 where the amount of the at least one monovalent or multivalent salt is present in the water in an amount from about 0.05 gps to above saturation.

15. The method of claim 11 where the at least one retarder is selected from the group consisting of sodium borate, boric acid, disodium tetraborate decahydrate, and combinations thereof.

16. The method of claim 15 where the at least one retarder is present in the aqueous fluid in an amount from about 0.01 to about 20% bwoc.

17. The method of claim 11 where the cement-forming aqueous fluid additionally comprises a defoamer.

18. The method of claim 17 where the defoamer is a silicon-based defoamer and where the amount of defoamer ranges from 0.001 to 0.1 gallons per sack of cement.

19. A method of drilling into a subterranean formation comprising:

introducing into a wellbore passing at least partially through the subterranean formation a cement-forming aqueous fluid comprising:

water;

at least one viscoelastic surfactant (VES) present in the cement-forming aqueous fluid in a range of from about 0.01 wt % to about 10 wt % based on the water;

at least one monovalent or multivalent salt present in the water in an amount from about 0.05 gps to above saturation;

at least one magnesium powder comprising 30-80 wt % MgO and greater than 20 wt % dolomite, which magnesium powder works as cement; and at least one retarder present in the aqueous fluid in an amount from about 0.01 to about 20% bwoc;

increasing the viscosity of the cement-forming aqueous fluid by the at least one VES forming elongated VES micelles; where the at least one monovalent salt or multivalent salt is present in an amount effective to pseudo-crosslink the elongated VES micelles to further increase the viscosity of the aqueous fluid;

forming a cement by reacting at least one magnesium powder and the water, where forming the cement is retarded from that which would otherwise occur but for the presence of the retarder; and thereby inhibiting fluid loss of the fluid into the formation.

20. The method of claim 19 where the forming the cement is triggered by a temperature of above 70° F. (21° C.).

* * * * *